(12) United States Patent
Owen

(10) Patent No.: US 6,508,037 B1
(45) Date of Patent: Jan. 21, 2003

(54) RAISED FLOORING SYSTEM & METHOD

(76) Inventor: David D. Owen, 9 Sagebush La., Hilton Head, SC (US) 29926

( * ) Notice: Subject to any disclaimer, the term of this patent is extended or adjusted under 35 U.S.C. 154(b) by 0 days.

(21) Appl. No.: 09/570,699

(22) Filed: May 15, 2000

Related U.S. Application Data

(63) Continuation-in-part of application No. PCT/US99/04230, filed on Feb. 26, 1999, which is a continuation-in-part of application No. 09/032,265, filed on Feb. 27, 1998, now Pat. No. 6,061,982.

(51) Int. Cl.[7] ............................................... E04B 1/00
(52) U.S. Cl. ..................... 52/220.1; 52/126.4; 52/126.6; 52/263
(58) Field of Search .............................. 52/126.1, 126.2, 52/126.5, 126.6, 263, 220.1, 220.3, 220.5

(56) References Cited

U.S. PATENT DOCUMENTS

| | | |
|---|---|---|
| 3,899,857 A | 8/1975 | Mochizuki |
| 4,319,520 A | 3/1982 | Lanting et al. |
| 4,368,869 A | 1/1983 | Gelvezon et al. |
| 4,606,156 A | 8/1986 | Sweers et al. |
| 4,676,036 A | 6/1987 | Bessert |
| 4,719,727 A | 1/1988 | Copper et al. |
| 4,729,859 A | 3/1988 | Munsey et al. |
| 4,850,176 A | 7/1989 | Munsey et al. |
| 4,874,127 A | 10/1989 | Collier |
| RE33,220 E | 5/1990 | Collier |
| 5,048,242 A | 9/1991 | Cline |
| 5,111,630 A | 5/1992 | Munsey et al. |
| 5,345,779 A | 9/1994 | Feeney |
| 5,363,613 A | 11/1994 | Sevier |
| 5,392,571 A | 2/1995 | Greenfield |
| 5,477,649 A | 12/1995 | Bessert |
| 5,483,776 A | 1/1996 | Poppe |
| 5,499,476 A | 3/1996 | Adams et al. |
| RE35,369 E | 11/1996 | Ducroux et al. |

OTHER PUBLICATIONS

Letter from Interface Architectural Resources of Grand Rapids, Michigan.
"InterfaceAR" literature by Interface Architectural Resources.
"Intercell Cable Distribution System" literature by Interface Architectural Resources.
"C–Tec Series" literature by Interface Architectural Resources.
"Interstitial System" literature by Interface Architectural Resources.
"Intergy Modular Power System" literature by Architectural Resources.

Primary Examiner—Beth A. Stephan
(74) Attorney, Agent, or Firm—Watts, Hoffman, Fisher & Heinke Co., L.P.A.

(57) ABSTRACT

A flooring system is disclosed which utilizes prefabricated floor panels installed in side by side relationship. The floor panels support a series of upstanding pedestals. The pedestals are positioned such that they provide a geometric pedestal array. The pedestals support panels which collectively define fluid conduit, power cable and communications chases. Working floor panels are mounted atop the pedestals. A heat pump is connected to supply, return and condensate conduits installed in the conduit chase to supply cooling water from a cooling tower. Metal and plastic embodiments are disclosed.

23 Claims, 9 Drawing Sheets

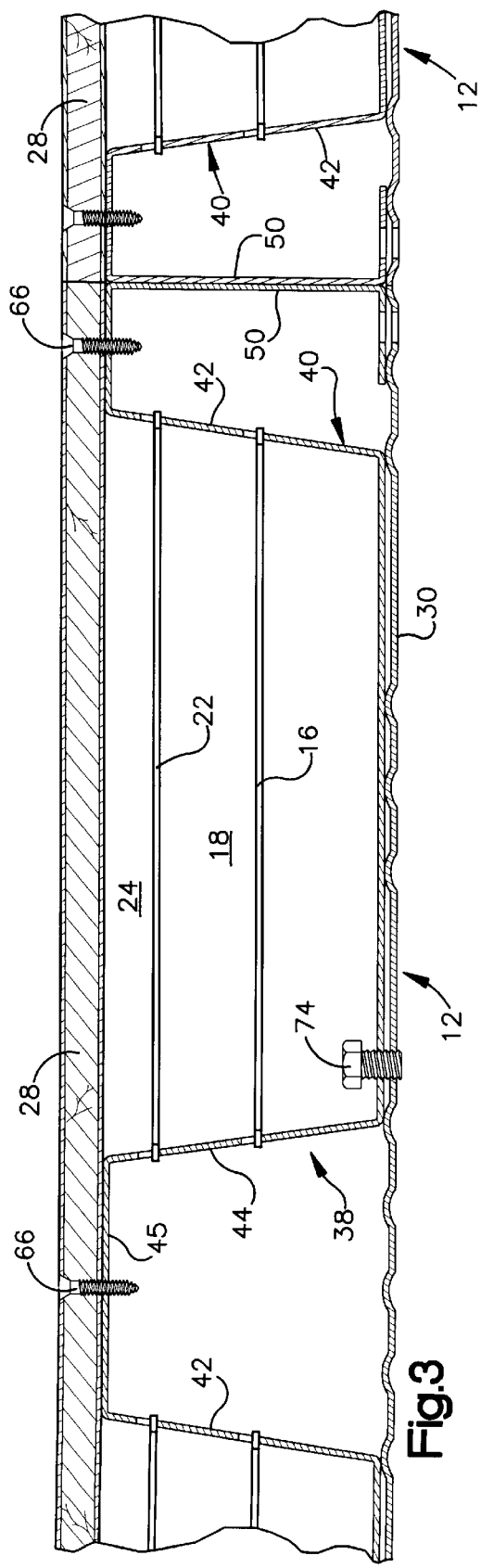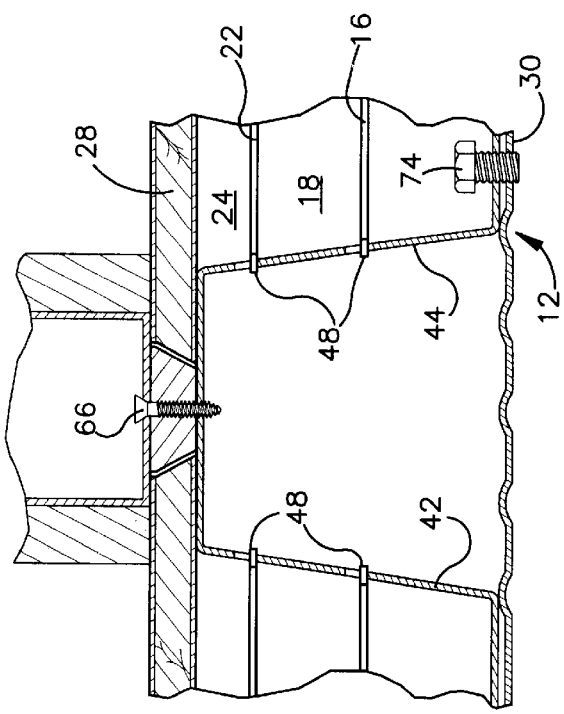

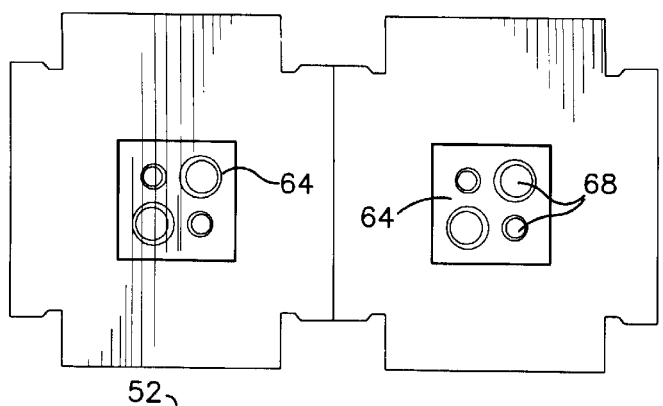
Fig.5
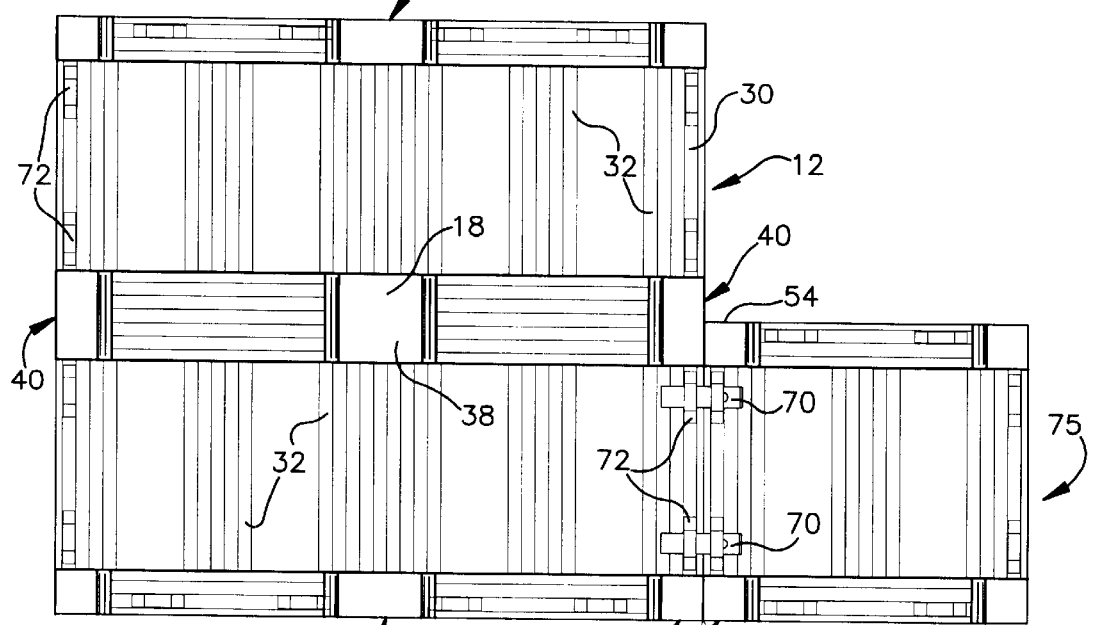
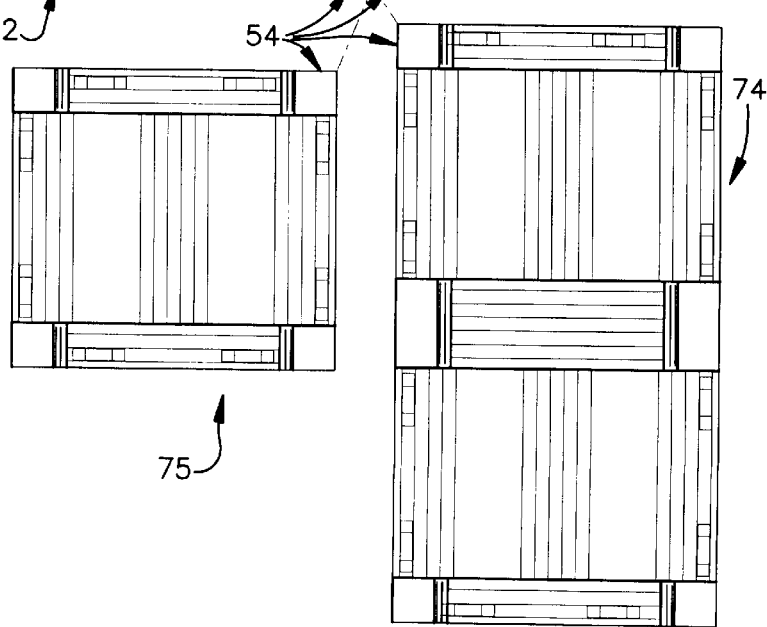
Fig.6

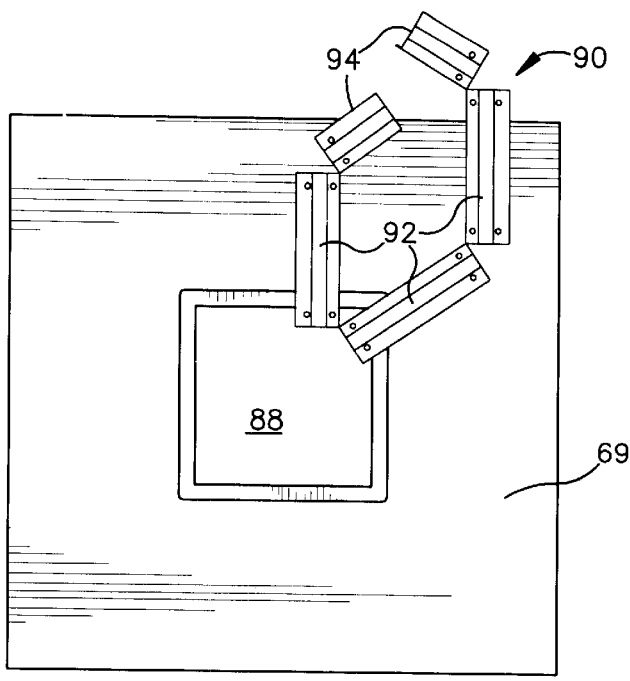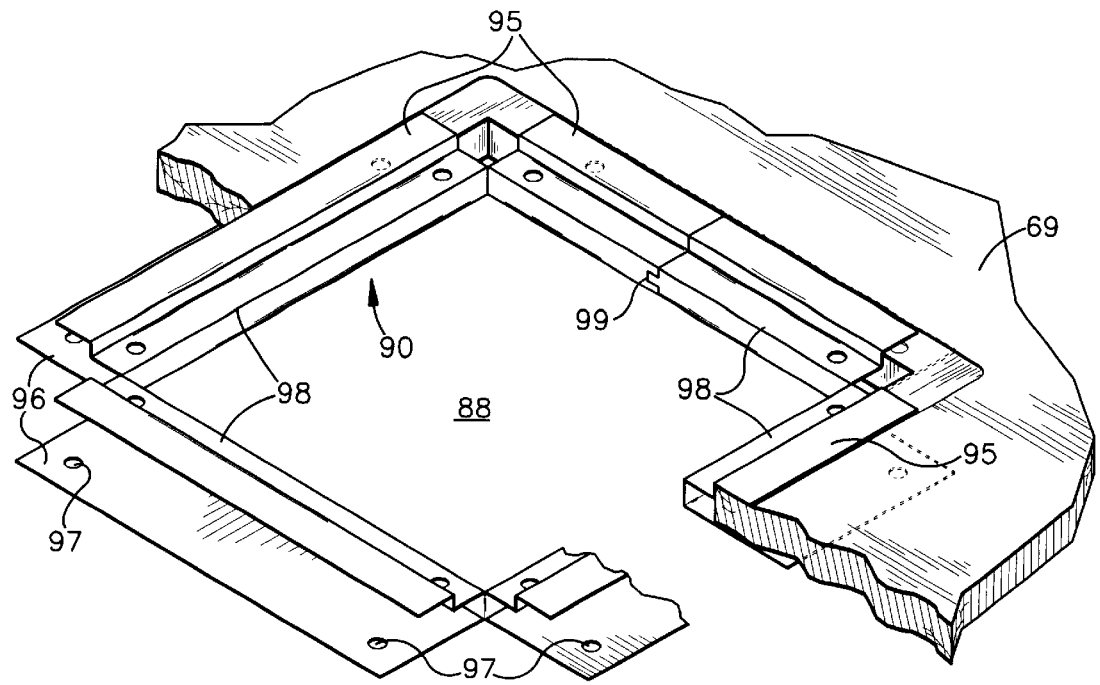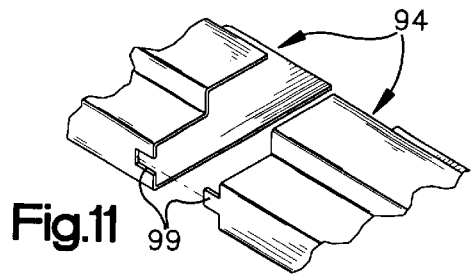

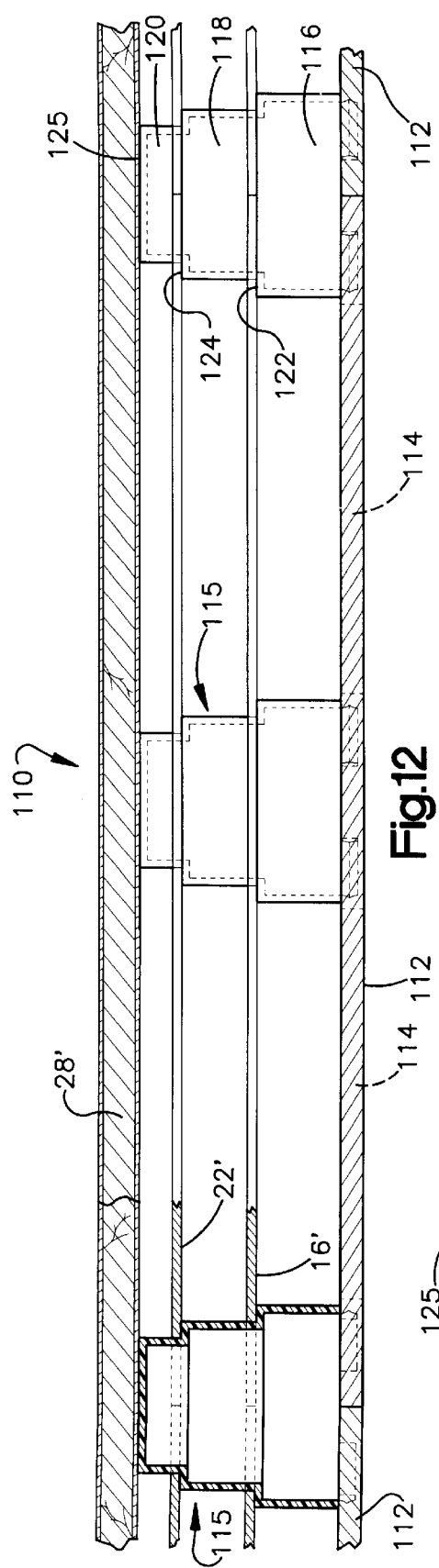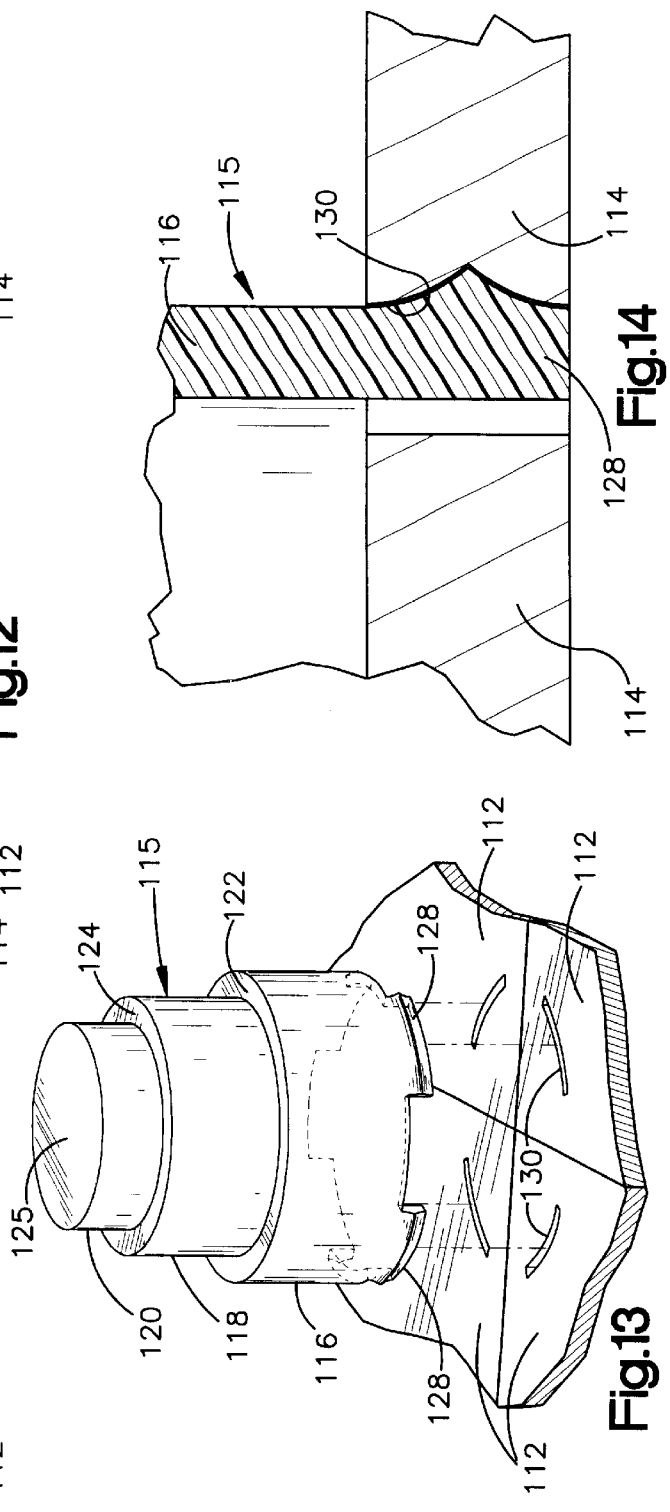

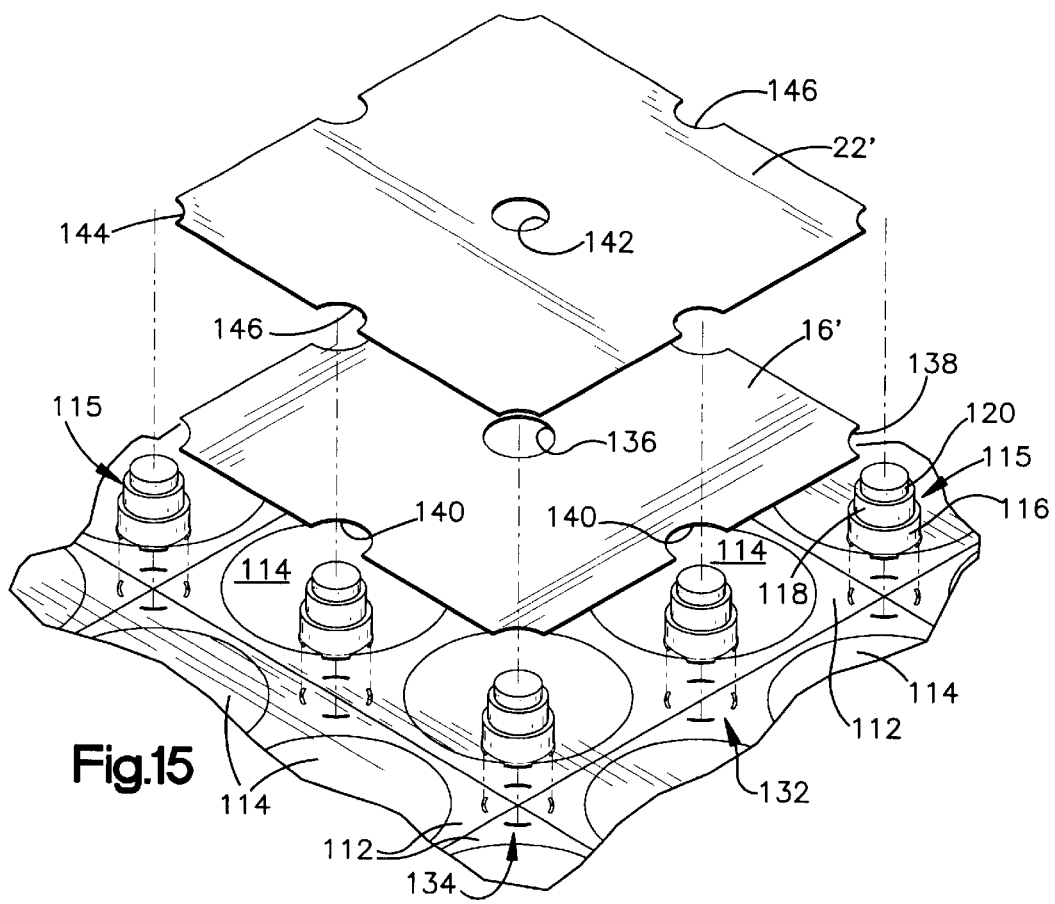
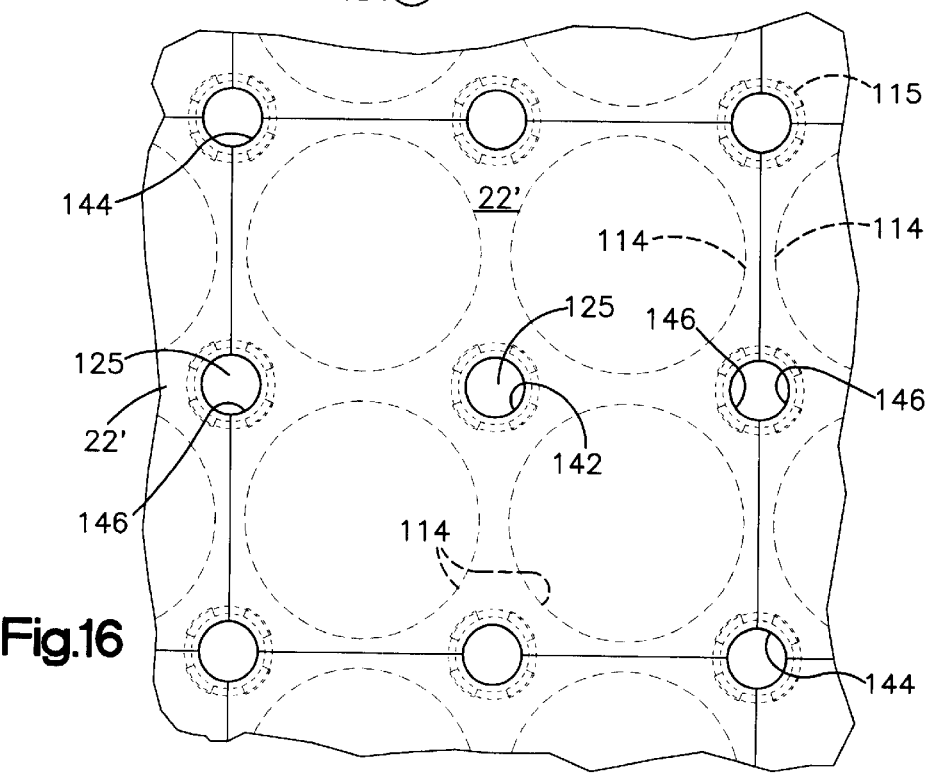

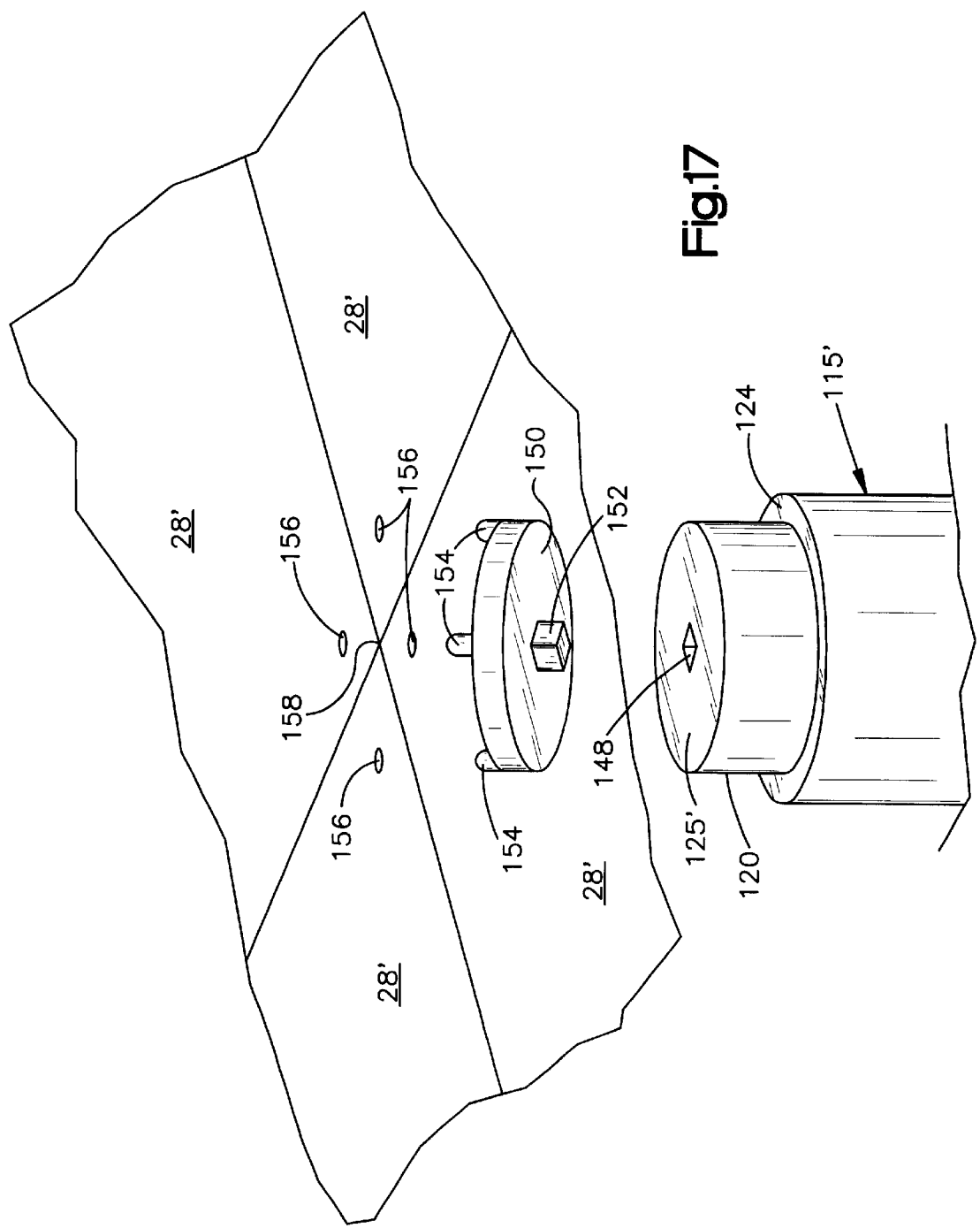

RAISED FLOORING SYSTEM & METHOD

RELATED BACK

This is a Continuation-in-Part application of application Ser. No. PCT/US99/04230, filed on Feb. 26, 1999, which is a continuation-in-part of U.S. application Ser. No. 09/032,265, filed Feb. 27, 1998.

This application is a continuation-in-part application of International application No. PCT/US99/04230 filed on Feb. 26, 1999 entitled RAISED FLOORING SYSTEM AND METHOD, which is a continuation-in-part of U.S. application Ser. No. 09/032,265 filed on Feb. 27, 1998 entitled RAISED FLOORING SYSTEM AND METHOD.

This invention relates to an accessible raised floor system for use in office buildings or the like.

BACKGROUND OF THE INVENTION

Historically, building owners have not had to deal with tenant requirements for supplemental cooling, power and cabling, with the exception of special purpose computer or trading rooms. These special purpose rooms have been dealt with almost as if they were separate structures. Unless a building was occupant owned, a tenant had to deal with these requirements. Now, due to the changes in market economies, frequently landlords are forced to solve problems of substantial increases in power requirements, additional cooling and cable distribution.

As the use of office space has evolved since the development of personal computers (PC), there has been an escalation in the need for and frequency of re-organization and re-configuration of office space. Enormous amounts of effort and study have gone into the planning and design of office space in order to render its use more flexible and sympathetic to user functions. Most of these efforts have been concentrated in modular space planning and systems furniture engineered to accommodate PCs.

Modern day office requirements have placed burdens on heating/cooling, electrical power distribution and cabling systems which were never anticipated when even the most modern office buildings were built. The rates of office reorganization and reconfiguration have escalated from about 10% to 15%, per year U.S. averages, in the early 1990's, to 35% to 50% in the mid 1990's, with some companies and industries exceeding 100% per year. The technological life expectancy of local and wide area networks cabling and connectors is currently about eighteen months to two years.

Physical concentrations of PCs and other electrical enhancements such as facsimile machines, copiers, printers, scanners, and in particular, the personnel operating the equipment, have placed extra-ordinary burdens on the most sophisticated and powerful heating, ventilating and air conditioning systems. These concentrations of equipment and personnel generated heat are most frequently offset by increasing the velocity of chilled air from overhead diffusers, usually at the expense of other areas, and to the discomfort of personnel.

Traditionally and technically there have been roughly seven predominant methods of distributing heating/cooling, electrical power and cable in horizontal planes from vertical sources, whether from a building core or from other vertical chases. They have been:

1) Through a ceiling plenum;
2) Through the use of conventional raised flooring systems, as have been used in computer rooms;
3) In-floor conduits or proprietary ducts;
4) A combination of plenum and under-floor distribution through rigid conduit into poke-through outlet boxes to the floor above;
5) Through stud and drywall partitions and/or column enclosures;
6) Through power poles; and,
7) Through system furniture panels.

All of these systems require the feeding of electrical power wiring and cabling through studding, systems furniture, in-floor conduit or ducts. Convenient, horizontal retro-feeding of electrical power wiring or cabling through finished stud and dry wall partitions is particularly difficult, costly, disruptive and sometimes, impossible unless sufficient conduit has been pre-installed.

The most flexible and common of these systems has been the use of ceiling plenums. This plenum approach has severe difficulties and limitations. All work must be performed from ladders or scaffolding. Most connections to work surfaces must be through stud and dry wall partitions or so-called power poles vertically to work surface or floor levels and then distributed horizontally using more stud and dry wall partitions, systems furniture or in-floor conduit or duct.

Once additional power is in place, an undesirable result is a comparable increase in generated heat, requiring more cooling. Typically such additional heat loads have not been anticipated nor dealt with in the base building design or construction.

Localized cooling solutions are being dealt with by trying to increase the output of existing systems such as pushing more air by using higher blower velocities. Increases in air velocities result in increased noise levels and are really nothing more than cycling air more rapidly through the base system which has a finite heat absorbing capacity.

There have been proposals for retrofitted auxiliary flooring systems all of which suffer distinct disadvantages. With one proposal, a lower forced air plenum would be provided for conducting supplemental cooling air to a workspace where heat generating electronic equipment has been installed. Other flooring components would be formed to define enclosed ducts above the air plenum for power cables and communication conductors. It is necessary that these enclosed ducts have imperforate walls to prevent spread of an electrical fire. In the event of such a fire, the egress of the supplemental conditioning air from the plenum would obviously be undesirable. It is for these reasons that building codes require all wiring be encased in fire resistant conduit.

Prior proposals for supplemental flooring systems have all been excessively complex such that they required skilled installers for disproportionately long periods of time. Further, prior proposed systems have not been fully modular and had inadequate provision for access to service lines extending through such a system.

Accordingly, there is a need for a simple to install supplemental flooring system which will quickly and flexibly accommodate power cable, communication wiring, and supplemental cooling to meet the demands of both current day and future electronic equipment.

SUMMARY OF THE INVENTION

The steel embodiment as described herein in conjunction with reference to FIGS. 1 through 11 is the subject matter of U.S. Pat. No. 6,061,982, issuing on May 16, 2000. It is nonetheless disclosed in some detail to assist in understanding how the short comings of the prior art are overcome.

The flooring system of the present invention utilizes prefabricated base modules which are preferably about 3' by 3' in horizontal dimension. These modules are installed in side by side relationship on an existing building floor. The modules are interconnected. In a metal embodiment the interconnections are accomplished by sliding key tongues into key slots of adjacent modules. In a plastic embodiment pedestals for supporting panels have depensions which interlock with the base modules. In the metal embodiment, leveling to accommodate irregularities of the building floor is achieved by adjusting leveling screws threaded into base panels of the modules.

The base panels of the metal embodiment each have elongate corrugations which stiffen the panel in one direction. Pedestal strips with their own elongated corrugations are secured to the base panels with the corrugations of the strips and panels orthoganal to one another so that together they provide a stiff module base. The pedestal strips have a series of upstanding pedestal portions. The pedestal portions are open sided, truncated pyramids each of which has oppositely, inwardly sloping side surfaces and a flat top surface. In the preferred embodiment further strips are secured to the base panel in orthogonal relationship to the pedestal strips. The further strips have upstanding portions which nest within the pedestal portions to close the sides of the pedestal portions.

The metal pedestal strips include end half pedestals at the juncture of a pedestal with a side edge of the base panel. When the modules are installed these half pedestals are butted together such that together they form a structure corresponding to full pedestals formed intermediate the ends of the strips. Similarly, four comer pedestals together form a structure corresponding to a full pedestal.

The tapering sides of the metal pedestals are notched to receive snap in steel panels. The snap in panels collectively define a power cable chase floor and a communications chase floor each above a base floor defined by the module base panels. With the metal embodiment, the panels, like other components of the system, are preferably steel (1) to protect such things as data cabling from power cable induced magnetic fields, (2) for structural strength, and (3) for fire resistance.

The plastic embodiment has a considerable weight advantage over steel, making it easier to install and highly advantageous in those situations where floor loadings may be a problem. With the plastic embodiment, pedestals in the form of axially aligned, cylindrical segments of diminishing diameters from bottom to top are provided. Each pedestal has a set of spaced arcuate depensions which fit in mating holes in the base panels to lock the panels together. Panels for chase panels with arcuate cutouts rest atop flat horizontal surfaces between adjacent, cylindrical pedestal segments.

Working floor panels are mounted atop the pedestals. Preferably these working floor panels are reinforced, steel clad, fire resistant plywood or other suitable material to provide an appropriate base for customary floor coverings such as carpet or tile.

An alternet working floor panel material which is preferred in those applications where floor loadings permit is sold under the designation MDO sign board. The MDO product has a ground wheat compressed within a resin core between specialized industrial paper layers. This MDO product and its paper layer are sold by Pacific Coating & Laminating of Kelso, Washington. The paper material is sold under the trademark PolyBak. The core material is made by a Canadian company and sold under the trademark Isoboard.

The power cable, communications and work floor panels of the metal embodiment each have knock outs which are readily removable to provide access to cabling and wiring supported on the floors. They also provide access to fluid conduits supported on the base floor.

One of the outstanding features of the invention is the use of water conduits in combination with heat pumps for supplemental heating and cooling. Supply, return and condensate conduits are installed on the base floor to conduct supply water at temperatures of about 60° to 90° F. A preferred source for the cooling water is a typical cooling tower of the type which is commonly mounted atop an office building. The use of water totally obviates the need for hermetic barriers between a cooling plenum and power and communication cable chases. Moreover, since the water used is cool no pipe wrap is required.

Accordingly, the objects of the invention are to provide a novel and improved supplemental flooring system and methods of installing and operating such a system.

BRIEF DESCRIPTION OF THE DRAWINGS

FIG. 3 is a sectional view of an assembled flooring system of FIG. 1;

FIG. 4 is a sectional view of a portion of the flooring system of FIG. 1 with a partition wall mounted atop it;

FIG. 5 is a plan view of two metal snap in panels used to form cable and communication floors FIG. 6 is a plan view of metal modules of the present invention;

FIG. 9 is a plan view of an apertured service line floor panel with a reinforcing member shown in a position it passes through prior to being inserted in and secured to the panel;

FIG. 10 is a perspective view of a central portion of a finished service line floor panel with parts broken away and removed for clarity of illustration;

FIG. 11 is a fragmentary, perspective view of a keyed section of the reinforcement of FIGS. 9 and 10;

FIG. 12 is a sectional view of the plastic embodiment in an assembled condition;

FIG. 13 is a fragmentary, exploded view of a plastic pedestal and portions of base panels of the plastic embodiment;

FIG. 14 is an enlarged, fragmentary sectional view of an interconnection of a plastic pedestal with a plastic base panel;

FIG. 15 is an exploded view of components of the plastic embodiment;

FIG. 16 is an enlarged plan view of a section of an assembly of the plastic embodiment with work floor panels removed; and FIG. 17 is a fragmentary perspective view of a pedestal and four floor panels equipped with an interlocking system.

DETAILED DESCRIPTION OF THE PREFERRED EMBODIMENT

I. The Metal Embodiment

Figure 1:
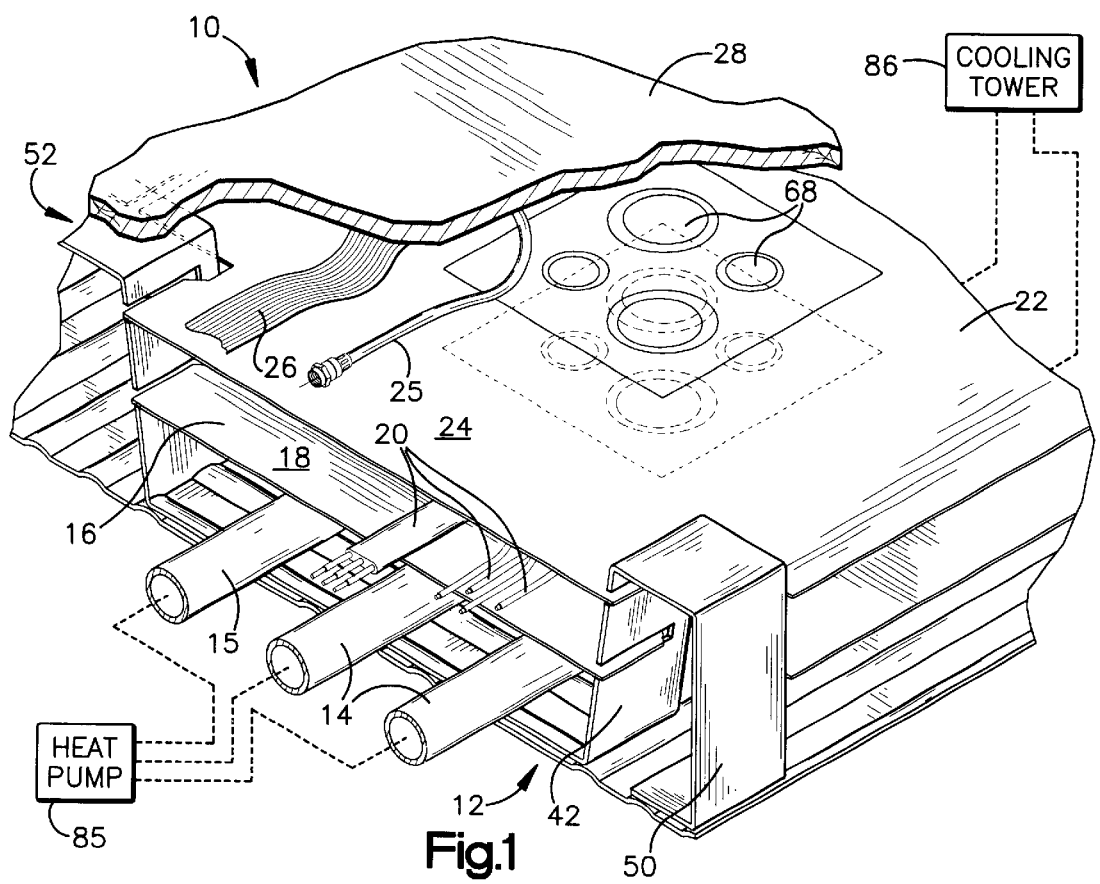
FIG. 1 is a fragmentary perspective view of a portion of a metal flooring system made in accordance with the present invention.

In FIG. 1, a flooring system made in accordance with the present invention is shown generally at 10. The system includes a modular base supporting supply and return water conduits 14 and a condensate conduit 15.

Cable floor panels 16 positioned above the conduits 14,15 form a floor for cable chase 18 supporting electrical cables and wires 20. Communication panels 22 define a floor beneath a communication chase 24. The communication chase houses communication cable 25 and data conductors 26 for such purposes as local area network interconnections.

A modular work floor 28 is mounted atop the modular base elements. The pictured work floor components 28 are ½" fire resistant plywood sheets which are steel clad for rigidity and fire resistance.

With the preferred construction, the overall depth of the system is approximately 4" with the lower water conduit chase having a vertical clearance of 1 ⅜", the cable chase having a vertical clearance of 1 ⅛" and the communication chase having a vertical clearance of ⅝".

Figure 2:
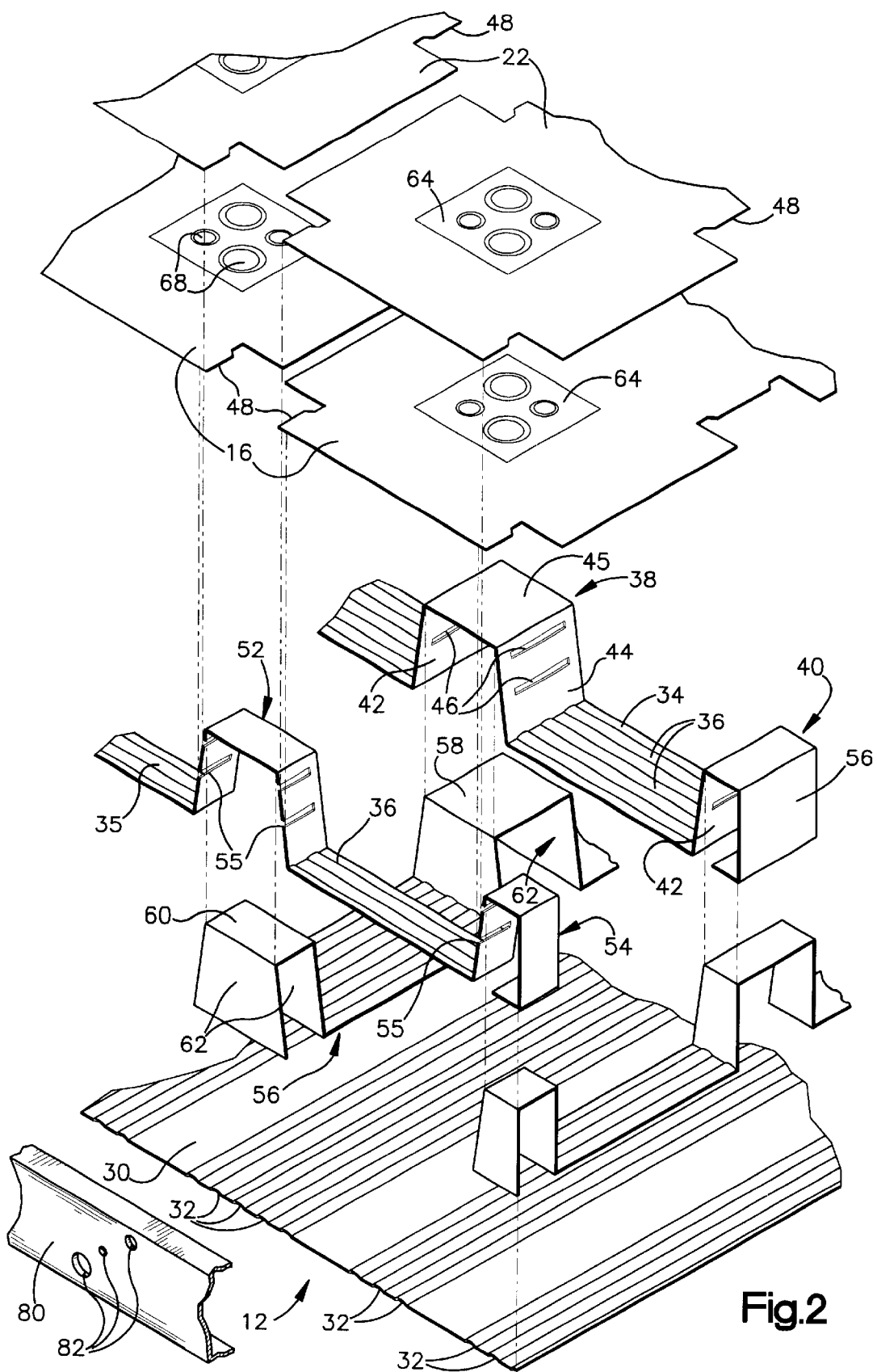
FIG. 2 is an exploded view of the metal embodiment of the present invention.

Referring now to FIG. 2, the preferred embodiment of a base module 12 is shown in exploded form. The base module 12 includes a base panel 30 having sets of stiffening ribs 32 formed therein. Central and edge pedestal strips 34,35 are provided. The central strips 34 are twice the width of the edge strips 35 so that when two modules 12 are abutted, two abutting edge strips will have a transverse dimension corresponding to the transverse dimension of a central pedestal strip 34. The pedestal strips 34,35 have longitudinal stiffening grooves 36. The base panels 30 and the pedestal strips 34,35 are welded together with their grooves 32,36 orthogonal to one another to provide bidirectional stiffening of the modules.

The central pedestal strip 34 includes central and end pedestals 38,40. The central pedestals 38 have oppositely tapered sides 42,44 and a flat top 45. In a system of the illustrative overall 4" height, the pedestal 38 at its base will be 4" square, while the top will have a width of 4" and a dimension longitudinal of the strip of 3". Each tapered pedestal side 42,44 is notched at 46 to receive projections 48 of the cable and communication panels 16,22 in snap-in supporting relationship.

Each end pedestal 40 includes a vertical support side 50 which butts against a like vertical support side 50 of an adjacent module 12, as best seen in FIG. 3. As will be apparent from an examination of FIG. 3, two of the end pedestals 40 when abutted together provide a pedestal corresponding to a central pedestal 38.

The end strips 35 have half central pedestals 52 and quarter corner pedestals 54. When a set of modules 12 are installed, an abutting pair of the half central pedestals 52 together provide a pedestal corresponding to the central pedestals 38, while four of the corner pedestals 54 in abutting relationship also collectively provide a pedestal corresponding to the central pedestals 38. The half and corner pedestals 52,54 have notches 55 which when installed collectively provide notches equivalent to the notches 46.

In the metal embodiment as shown in FIG. 2, further strips in the form of cross strips 56 are provided. The cross strips 56 have central and end closures 58,60. The central and end closures 58,60 of the cross strip respectively nest within the central and side pedestals 38,52. The central and side closures 58,60 have vertical side walls 62 with upwardly and oppositely tapered edges such that the side walls 62 close side openings in the central and edge pedestals 38,52. Accordingly, the space within each pedestal in the preferred embodiment is enclosed except for the projection receiving notches 46. With this construction it is anticipated that the disclosed flooring system will satisfy many, if not most, building code requirements without further electrical conduits enclosing, for example, the electrical cable 20.

As shown in FIGS. 1, 2 and 5, the snap-in panels 16,22 each include a square knock out portion 64 which may be removed to gain access to service lines below the panel and to receive a standard 4×4 junction box for feeding, for example, a connection to the cable 20. To gain access to the three service chases, one simply removes screws 66 securing a floor panel section 28 to the pedestals and lifts the then disconnected floor panel out of the way. Where access is desired through one of the cable floor panels, the communication floor panel above it is removed by prying its projections 48 out of the notches 46 with a screw driver or other suitable prying tool.

Each knock out 64 includes four circular knock outs 68 which may be removed if one only needs to install a standard circular fitting. For example, a circular knock out will be removed to bring a cable connection through a standard fitting positioned in an aperture provided by removing one of the knock outs 68. A service line floor panel 69, FIGS. 9 and 10, is substituted for the removed floor panel 28 when service lines are to be fed through the floor.

Metal Embodiment Installation

Figure 7:
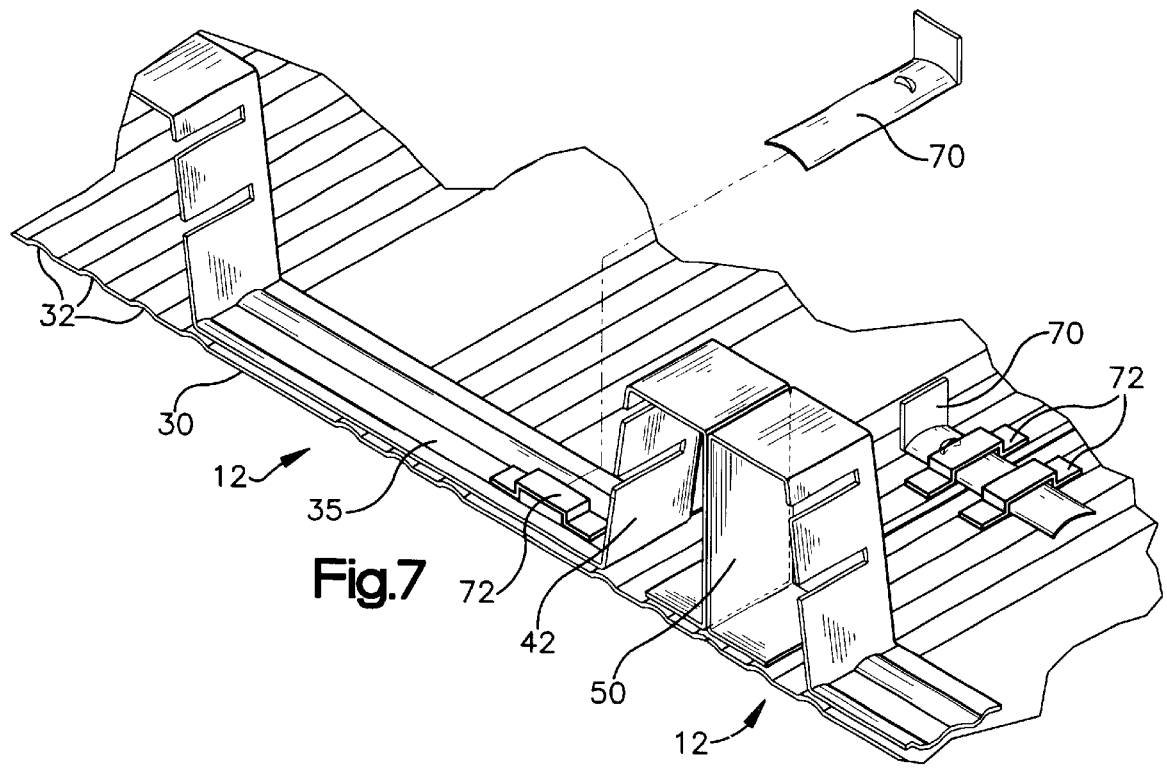
FIG. 7 is a fragmentary perspective view of metal base modules of the present invention showing mechanism for locking the modules together.

With the preferred construction the modules 12 are each approximately 3' square. so that they are small and light enough that a single installer can handle them. The modules 12 are positioned in abutting relationship atop the floor of an existing building. Keys 70, FIG. 7, are slid into key slots 72 to secure adjacent modules together. If there is unevenness in the floor, leveling screws 74, FIGS. 3 and 4, threadedly carried by the base panels are adjusted.

Figure 8:
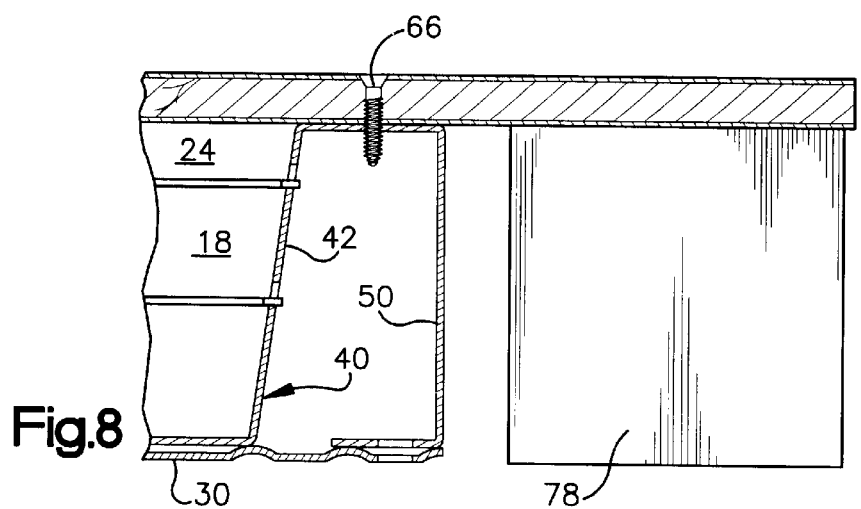
FIG. 8 is a fragmentary sectional view of a cantilevered floor portion and a supplemental pedestal of the metal embodiment.

For perimetral areas where full modules 12 will not fit, half and quarter modules 74,75 are provided, FIG. 6. If a half or quarter module will not fit because, for example, the space between in the installed modules and a wall or column is less than 18", cantilevered floor panels are used. In the preferred 3'×3" module arrangement, 36"×54" panels are provided. Such panels can be scribed and cut to a appropriate length at a job site to provide an appropriately dimensioned cantilevered portion. Where required supplemental pedestals 78, FIG. 8, are positioned to support the cantilevered portions. In a system of the size we have described, the supplemental pedestals are hollow, metal 3.5" cubes.

Once the modules have been positioned, interconnected and leveled, the installer has provided a geometric array of pedestals which are preferably 12' apart center to center as measured both longitudinally and transversely of the room in which the system is being installed.

Next, the supply, return and condensate conduits 14,15 are installed over the base floor. Once these water conduits are installed, the cable panels 16 are put in place with their projections 48 snapped into the notches 46,55 of the pedestals. Knock outs 64 or 68 are removed as required to interconnect the conduits 14,15 with a heat pump 85 and a source of suitable water, such as a building cooling tower 86, FIG. 1. The heat pump obviously will be installed at an appropriate time and at a location suitable to provide supplemental cooling for a work space in which employees and heat generating equipment will be present.

Next, electrical power cables or wires 20 are laid on the power cable panels and in the power cable chase 18. Communication panels 22 are now snapped into place and knock outs removed to provide appropriate connections with the power cables and wires 20 and the conduits 14,15. Communication conductors such as telephone lines and local area network connections 25,26 are now positioned in communication chase 24.

The floor panels 28 are positioned and secured by the screws 66. In the process of positioning the floor panels 28, service line floor panels 69 are used to feed connections from the conduits, cable and communication lines to the work space above the work floor being formed. Further, where perimetral portions are exposed, end panels 80 equipped with knock outs 82 are installed.

A retrofitted floor system installed in the described manner provides a system capable of fulfilling modern day and future service line requirements with minimal reduction in available space for equipment and personnel.

The Reinforcement Panel 69

Referring now to FIG. 9, the service line panel 69 includes a central, preferably 4" square, aperture 88. In order to provide a service panel 69 of sufficient structural strength and rigidity a reinforcement 90 is provided. The reinforcement 90 is formed from a single piece of steel to include three side sections 92 and two half side sections 94. As indicated by the showing in FIG. 9, these sections are interconnected in a fashion which permits relative movement such they may be folded into the shape shown in FIG. 9 to enable insertion into the aperture 88. Once inserted, upper and lower flanges overlie the top and bottom of the service line panel 69. The lower flanges 96 are secured to the surface panel 69 as by screws not shown passing through apertures 97 in the lower flanges. The side sections 90,92 define recessed channel portions 98 for support of an insert such as a junction box. The half side sections 94 are keyed at 99 for reinforcement at their juncture when installed as is best seen in FIGS. 10 and 11.

II. The Plastic Embodiment

Referring to FIGS. 12–16 and FIG. 12 in particular, an assembled flooring system utilizing plastic components is shown generally at 110 in FIG. 12. A plurality of base panels 112 are provided. Each base panel has four relatively large through apertures 114 which are provided to minimize weight and material consumed.

A plurality of pedestals 115 are provided. The pedestals include base, central and top conical segments 116,118,120. The conical segments are axially aligned and contiguous to define support surfaces for panels. More specifically an annular surface 122 which is flat and horizontal when in use interconnects the base and central segments for support of cable floor panels 16'. Similarly, a flat annular surface 124 interconnects the central and top segments 118,120 for support of communication panels 22'. A flat top surface 125 functions as a support surface for work floor panels 28' which rest atop the pedestals.

As is best seen in FIG. 13, each pedestal 115 includes four arcuate depending segments or tabs 128. The tabs snap into and interfit with complementally contoured recesses 130 in the base panels. The tabs are of a vertical dimension equal to the thickness of the floor panels.

As is best seen by reference to FIG. 15, there are four tabs 128 which, depending on their location, engaged one, two or four of the base panels 112. Thus, a pedestal mounted atop the center of a panel has all four tabs retentively engaged by the same panel. Where a pedestal bridges the joint between two adjacent panels as at 132 in FIG. 15, two projections engage each of the two panels. Where the panel is mounted at the juncture of four corners as at 134 in FIG. 15, the coaction of the tabs and their complemental recesses 130 function to secure the four corners in appropriate relative orientation.

When a pedestal 15 is mounted along the edge of a panel array it will engage one, two or three panels and one or two of its projections will be outboard of the array. Since the projections have a vertical height equal to the thickness of the panels, the outboard projections will engage the supporting building floor and maintain the pedestals in a vertical orientation.

The cable floor and communication panels 16',22' are each flat, plastic sheets with cutouts to receive appropriate portions of the pedestals 115. Thus, the cable floor panels 16' each have a central circular aperture 136 sized to fit around the central conical segment 118. In addition, the cable floor panels 16' have corner cutouts 138, each of which constitutes a quarter of a circle such that four adjacent panels 16' collectively surround a central conical segment 118 of a single pedestal 115. The cable floor panels 16' have four semi-circular cutouts 140 located along each side midway between two corners. These semi-circular cutouts 140 permit adjacent panels to be positioned side by side and supported by a common pedestal midway between their respective corners.

The communication panels 22' have similar central holes 142 and corner side cutouts 144,146. The holes and cutouts of the communication panels 22 are sized to fit around the top conical segments 120 such that the communication panels are supported on the surfaces 124 of the pedestals 1 15.

When utility lines such as cables or fluid conduits are to be extended from one of the chases upwardly into a work area above the floor assembly, panels are removed. The removed panels are replaced by panels each having preformed apertures. The preformed apertures are sized to receive the upwardly extending utility lines. Alternately, apertures are cut in the removed panels which are then returned to their original positions in the assembly.

Referring now to FIG. 17, a preferred floor panel to pedestal interlock construction is shown. The pedestal 115' is equipped with a top, preferably square, locking aperture 148. A panel locking connector 150 is interposed between a supporting pedestal and working floor panels 28'. The connector has a depending square lock element 152 which is insertable into the aperture 148 in rotation preventing, positioning relationship. The connector has four upstanding, preferably cylindrical, floor locking projections 154. The projections 154 are arranged in circumferentially spaced relationship. The projections are arranged to project into locking apertures 156 in working floor panels 28'. Each locking aperture is formed near a corner of its floor panel 28'. Thus the floor panels are fixed together with the corners meeting in essentially line contact at 158.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. A flooring system for installation in an existing building comprising:
   a) a plurality of pedestal elements for mounting in a geometric array upon a building floor, each of the pedestal elements including a plurality of adjacent, axially aligned, segments of circular cross section in a stepped configuration to provide panel supporting surfaces;
   b) a set of power cable support panel elements each supportable by a plurality of said surfaces for support by the pedestal elements to provide a cable floor above and spaced from the building floor;
   c) a plurality of communication conductor support panel elements each supported by another plurality of said surfaces at a level above the cable support elements to provide a conductor floor above and spaced from the cable floor, and
   d) a plurality of working floor panel elements for support by the pedestal elements to provide a working floor surface above and spaced from the conductor floor.

2. The system of claim 1, further including a plurality of fluid conduits for mounting above such building floor and below the cable and conductor floors.

3. A flooring system made in accordance with claim 1, further comprising supply and return fluid conduits for positioning above the building floor for connection to a heat exchanger to provide heating and cooling for a space above the building floor.

4. The system of claim 3, further including a heat exchanger adapted to provide supplemental heating and cooling selectively and one at a time.

5. The system of claim 4, wherein the conduits are adapted to be connected to a source of water.

6. The system of claims 5, wherein the conduits are adapted to be connected to a source water in the form of a building cooling tower.

7. The process of claim 5, wherein the source supplies water at from 60° F. to about 90° F.

8. In combination with a building flooring system in accordance with claim 1, installed on the floor of the building and further including a base floor interposed between the pedestal elements and the floor of the building.

9. The combination of claim 8 wherein the base floor comprises a plurality of base panels and the panels and pedestals include coacting lock elements interconnecting the base panels.

10. The system of claim 1 wherein at least some of the elements are formed of organic material.

11. The system of claim 1, wherein the elements are formed of organic material.

12. The system of claim 11, wherein the organic material is plastic.

13. The system of claim 1, wherein the pedestal elements are molded plastic elements.

14. A support system for multiple floors of a sub-work surface utility line containment system comprising:
    a) a plurality of pedestal sets;
    b) a base floor comprised of floor elements for mounting on a floor of a building to be provided enhanced utility services;
    c) the pedestal sets and the base floor being adapted to provide a geometric array of floor support pedestals; and
    d) the pedestals of the sets and the base floor elements having interlocking projections and apertures to secure the relative positions of the pedestals and the elements in the array, the elements being secured relative to both one another an pedestals by the interlocking projections and apertures.

15. The system of claim 14, wherein each of the pedestals includes a plurality of floor panel support surfaces for supporting utility support floor panels.

16. The system of claim 14, wherein each of pedestals includes top surfaces for support of work floor panels.

17. The system of claim 14, wherein each of a set of floor locks are provided and each lock is interposed between and interlocked with an associated one of the pedestals and work floor panels supported by the associated pedestal.

18. The system of claim 14, wherein work floor panels are supported on the pedestals and lock elements secure the work floor panels to the pedestals.

19. The system of claim 1 wherein the working floor panel elements are each a lamination having outer paper layers and a fiber strengthened resin core.

20. For use in a flooring system, a pedestal to working floor pan interlock connector comprising:
    a) a body adapted to be interposed between a supporting pedistal and working floor panels;
    b) a pedestal interlocking element depending from an undersurface of the body when the body is in use for coaction with a locking aperture in one said supporting pedestal; and
    c) a plurality of floor locking projections extending from a surface opposite the undersurface each for establishing an interlocking relationship with a different supported floor panel to thereby fix this relative positions of a plurality of aid panels.

21. The interlock of claim 20 wherein the element has surfaces adapted to interlock with the locking aperture to limit relative rotation of the connector and associated pedestal.

22. The interlock of claim 21 wherein the projections are cylindrically contoured.

23. The interlock of claim 20 wherein the projections are cylindrically contoured.

* * * * *